J. B. BARTHOLOMEW.
PLOW.
APPLICATION FILED APR. 24, 1913.

1,143,163.

Patented June 15, 1915.
2 SHEETS—SHEET 1.

Witnesses
Edwin F. Frey
S. Jay Teller

Inventor
John B. Bartholomew
By H. H. Bliss
Attorney

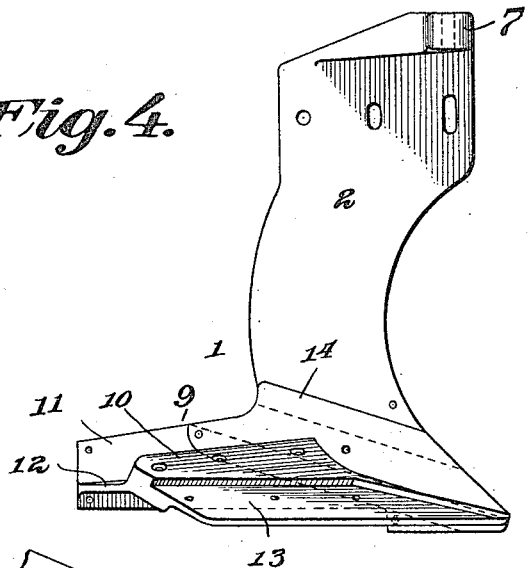
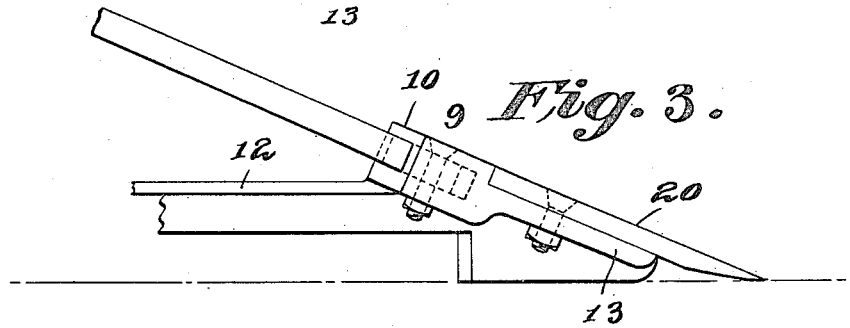
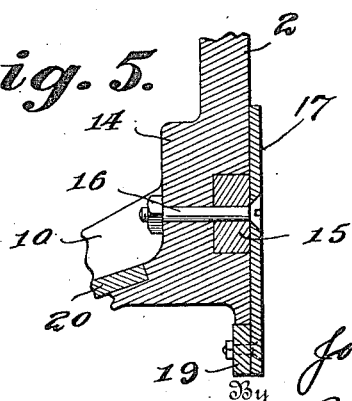

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

PLOW.

1,143,163.  Specification of Letters Patent.  Patented June 15, 1915.

Application filed April 24, 1913. Serial No. 763,321.

*To all whom it may concern:*

Be it known that I, JOHN B. BARTHOLOMEW, a citizen of the United States, residing at Peoria, in the county of Peoria and State of Illinois, have invented certain new and useful Improvements in Plows, of which the following is a specification, reference being had therein to the accompanying drawing.

This invention relates to improvements in plows or plow bodies of the type adapted for breaking up extremely heavy soils, especially those soils which contain heavy grubs and roots. In many localities in which such grubs and roots are met with plowing has been extremely difficult and in many places practically impossible. It is for such conditions as these that plows embodying my invention are intended.

Stated more specifically the objects of my invention are to provide a plow of this general character having an improved arrangement of soil and root cutting breaking and turning devices and improved means for supporting and connecting these devices.

Another object is to provide a plow in which all of the working parts are substantially straight and capable of being formed without forge work.

Other objects of the invention will be apparent from the following specification and the claims.

Plow bodies embodying my invention can be used singly or in gangs as desired.

In the accompanying drawings I have shown one plow body connected to a standard such as is commonly used for connecting individual plows to a gang plow frame. It will be understood however that as to this there may be variations.

Figure 1:
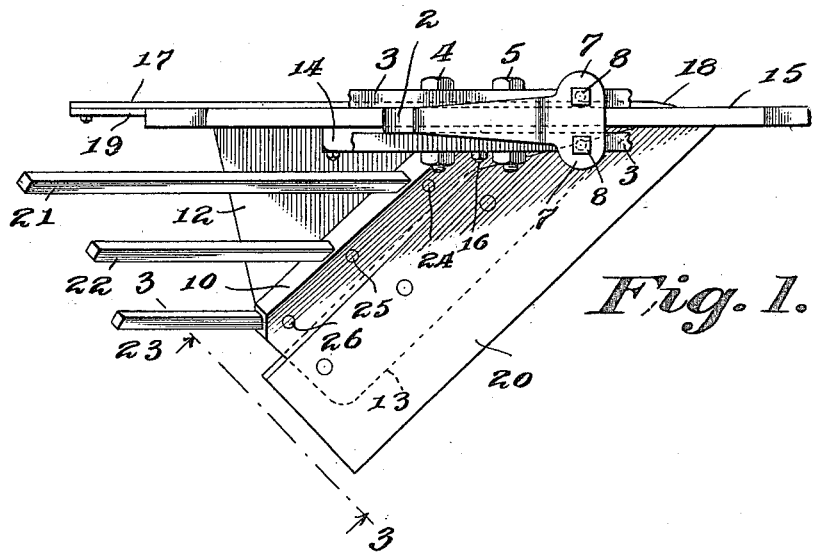
Figure 2:
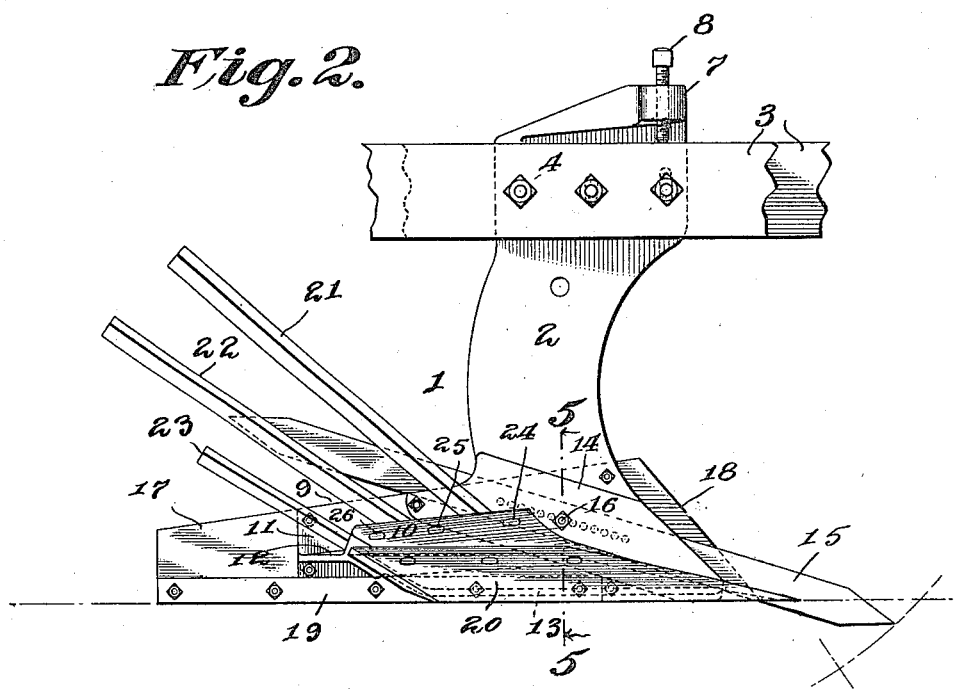

Of the drawings Figure 1 is a plan view. Fig. 2 is a side elevation. Fig. 3 is a detail view taken looking in at the plow along the line 3—3 of Fig. 1. Fig. 4 is a view showing the plow standard and frog detached from the other parts. Fig. 5 is a fragmentary sectional view taken along the line 5—5 of Fig. 2.

Referring to the drawings 1 represents as a whole the plow standard and frog, these parts being formed integrally preferably of cast steel. The casting 1 has a vertical section 2 which will be termed the standard. The standard 2 is flat and relatively thin and extends upward between the two bars 3—3 which constitutes the beam by means of which the plow is moved. The standard is connected to the beam by means of three bolts 4, 5 and 6. The bolts 5 and 6 extend through arcuate slots in the standard which are formed concentric with the aperture for the bolt 4. It will be clear that the standard can be adjusted with respect to the beam. For effecting this adjustment the standard is provided at its upper forward corners with two laterally projecting lugs 7—7, and extending through threaded apertures in the lugs 7—7 are bolts 8—8 the lower ends of which engage the beam bars 3—3. By turning these bolts the standard and the plow as a whole can be moved with respect to the beam. The standard can be secured in adjusted position by tightening the nuts on the bolts 5 and 6.

9 indicates as a whole the frog portion of the casting 1. This frog comprises a main body part 10 which extends horizontally, laterally and rearward from the standard.

11 is a vertical web part which extends backward from the standard in line with the land-side part thereof.

A horizontal web part 12 serves to connect the two parts 10 and 11.

Extending forward and downward from the body part 10 of the frog is a flange or web 13. This flange joins the standard at one end.

The standard 2 is provided at 14 with an enlarged or thickened portion which is inclined, the rear part being higher than the front part. Formed in the land side part of the standard and extending into the thickened part 14 is an inclined groove adapted to receive a digger bar 15 with its surface flushed with the land-side surface of the standard. This bar 15 is pointed at both ends and can be reversed to bring either end into operative position. The active end extends to a point ahead of and below any other part of the plow and therefore serves to cut and break the soil and roots preparatory to the action of the other parts. The bar is held in place by means of a bolt 16 which extends through the bar and through the standard. Preferably the bar has a number of holes for receiving the bolt 16 and in this way the bar can be secured in any one of a plurality of positions.

17 is a flat land-side which is bolted to the standard and to the web 11. This land side is beveled on its outer surfaces so that it has a sharp cutting edge 18 adjacent the bar 15.

19 is a reinforcing strip secured to the lower edge of the land-side.

20 is a flat share which is bolted to the inclined flange 13 of the frog and which abuts at its rear edge against the body part 10 of the frog. The construction is such that the top surface of the share is flush with the top surface of the frog, which serves as a mold-board section. The share 20 is beveled at its land-side so as to abut against the standard and against the digger bar 15. The forward edge of the share is beveled to form a sharp cutting edge.

The body part 10 of the frog is provided with a plurality of rectangular apertures adapted to receive rectangular bars 21, 22 and 23. These bars are held in place by suitable bolts 24, 25 and 26.

The operation of the plow will be readily understood from the foregoing description. The plowman first adjusts the standard with respect to the beam to bring the plow into the proper angular position. He then adjusts the digger bar 15 to bring it into proper position with respect to the other parts. The plow is then ready for use. In plowing the point of the bar 15 is forced through the ground and its flat forward edge serves to loosen the soil and to either break off or to lift up any horizontally extending grubs or roots which may be encountered. The roots caught by the point of the digger bar are forced gradually upward as the plow advances and they are finally caught and cut by the sharp forward edge 18 of the land-side. The sharp horizontal edge of the share serves to loosen the soil and to cut and break any roots or grubs which may extend at an angle to the horizontal. The soil caught by the share is gradually worked upward as the plow advances and is finally lifted and turned by the bars 21, 22 and 23 which, in combination with the upper surface of the frog, have the function of the usual mold-board.

What I claim is:—

1. In a plow, the combination of an integrally cast combined standard and frog having a surface adapted to serve as a mold-board section, a beam to which the standard is connected, a land-side connected to the frog, a share connected to the frog, with its upper surface flush with the mold-board surface thereof supplemental mold-board elements connected to the frog, and a point connected to the frog.

2. In a plow, the combination of a standard, a frog, a forward and downward inclined digger bar connected to the frog in planes parallel to the line of draft, a land-side secured to the frog in a vertical plane parallel to the line of draft, the forward edge of the land-side being sharp and located in an exposed position close to the side of the digger bar, and a share connected to the frog and provided with a sharp edge.

3. In a plow, the combination of an integrally formed combined standard and frog having a forward and downward inclined groove in its land-side surface, a digger bar positioned in the groove with its land-side surface flush with the land-side surface of the standard and frog, a land-side secured to the land-side surface of the standard and frog, the said land-side having an exposed sharp forward edge, and a share connected to the frog and having a sharp forward edge.

4. In a plow, the combination of a standard, a frog, a land-side connected to the frog, and a share connected to the frog with its upper surface flush with a part of the upper surface of the frog.

5. In a plow, the combination of a standard, a frog, a land-side connected to the frog, a share connected to the frog, and a plurality of mold-board bars set into suitably shaped and positioned apertures in the frog.

6. In a plow, the combination of a frog, a share, a mold-board, and a land-side having a sharp forward edge the upper part of which is positioned in advance of the immediately adjacent parts of the other plow elements in the same horizontal planes.

7. In a plow, the combination of a frog having a surface adapted to serve as mold-board section, a share connected to the frog in advance of the said mold-board section thereof, and supplemental mold-board elements connected to the frog with their active parts behind the mold-board section thereof.

8. In a plow, the combination of a frog, a forward and downward inclined digger bar, a land-side having an exposed sharp forward edge abutting the digger bar at one side thereof, and a share abutting the digger bar on the other side thereof.

In testimony whereof I affix my signature, in presence of two witnesses.

JOHN B. BARTHOLOMEW.

Witnesses:
K. M. MORGAN,
F. N. GUNDLACH.